United States Patent
Irie

(10) Patent No.: US 6,636,806 B1
(45) Date of Patent: Oct. 21, 2003

(54) GUIDE DISPLAY METHOD IN ON-VEHICLE NAVIGATOR

(75) Inventor: Takashi Irie, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/069,548

(22) PCT Filed: Jul. 4, 2000

(86) PCT No.: PCT/JP00/04448
§ 371 (c)(1),
(2), (4) Date: Feb. 27, 2002

(87) PCT Pub. No.: WO02/03033
PCT Pub. Date: Jan. 10, 2002

(51) Int. Cl.[7] ............................................. G01C 21/30
(52) U.S. Cl. ................... 701/211; 701/208; 701/209; 701/210; 340/990
(58) Field of Search ..................... 701/72, 200, 201, 701/202, 207, 208, 209, 210, 211, 212; 340/988, 990

(56) References Cited

U.S. PATENT DOCUMENTS

| 6,049,753 A | * | 4/2000 | Nimura ....................... 701/201 |
| 6,067,499 A | * | 5/2000 | Yagyu et al. ................ 701/201 |
| 6,072,409 A | * | 6/2000 | Fushimi et al. ............. 340/988 |
| 6,125,323 A | * | 9/2000 | Nimura et al. .............. 701/207 |
| 6,163,750 A | * | 12/2000 | Nojima ....................... 701/209 |

FOREIGN PATENT DOCUMENTS

| JP | 63-10299 A | 1/1988 |
| JP | 07-190791 A | 7/1995 |
| JP | 9-127867 A | 5/1997 |

* cited by examiner

*Primary Examiner*—Gertrude Arthur
(74) *Attorney, Agent, or Firm*—Birch, Stewart, Kolasch & Birch, LLP

(57) ABSTRACT

A link that is closest to a departure place of one's vehicle is detected by a route searching. When a U-turn route link to come back from the closest link by passing from the closest link through the U-turn route again to the closest link is detected, a U-turn guide is made, based on a signal of this detection, to the effect that a return is made to the present position after a U-turn.

6 Claims, 5 Drawing Sheets

GUIDE DISPLAY METHOD IN ON-VEHICLE NAVIGATOR

This application is the national phase under 35 U.S.C. §371 of PCT International Application No. PCT/JP00/04448 which has an International filing date of Jul. 4, 2000, which designated the United States of America.

BACKGROUND OF THE INVENTION

1. Field of the Invention

This invention relates to a guide indication method in an onboard navigator which performs a most optimum route guiding and route instruction for a vehicle, and relates particularly to a guide indication method in case one's vehicle makes a U-turn ahead of one's vehicle and passes again through the present position.

2. Description of the Related Art

Conventionally, for example, as shown in FIG. 5, when one's vehicle M travels on a road 1 and enters a road 2 to proceed to a destination, it turns to the left, if an intersection 4 prohibits right-turn, thereby traveling on the road 3 in the direction of arrows. One's vehicle then makes a U-turn at a U-turn spot 5 and travels again on a route returning to the intersection 4 and, thereafter, enters the road 2 to continue along the route to the destination.

In such a road traffic condition, the guide in an onboard (in-vehicle) navigator is to indicate the U-turn route by means of an arrow, a colored line, or the like, and a voice guidance is also made like "U-turn route ahead", or the like.

In the conventional guide indication method, in a case where one's vehicle passes through the U-turn route and returns to the original position as described above, a guide is made to the effect that the U-turn will be made ahead, but no indication will be given of returning to the original position.

In case of a map navigator, the fact of returning to the original position will be known if an entire view of the U-turn route is indicated. However, if the U-turn spot is far away, the map can be sometimes indicated only partially. In such a case, it is not known at all whether one's vehicle returns to the original position or not. Therefore, the driver of one's vehicle was obliged to take the trouble of following the guide of the onboard navigator to thereby return to the original position after passing through the far U-turn spot.

As an onboard navigator, aside from the above-described map navigator, there is known a so-called arrow navigator in which indication is made only by an arrow without indicating a map. In this kind of arrow navigator, there is indication of neither a U-turn route nor a character. The driver was therefore unable to avoid the trouble of following the guide of the arrow, and returning to the original position after passing through the far U-turn spot.

This invention has been made to solve the above-described kind of drawbacks and has an object of obtaining a guide indication method in an onboard navigator in which, when one's vehicle makes a U-turn ahead of one's vehicle and passes again through the present position, that information has to be reported.

SUMMARY OF THE INVENTION

A guide indication method in an onboard navigator according to this invention in which a route guide to a destination along a route set in advance is indicated on a display comprises the steps of: detecting, through route searching, a closest link in a departure place of one's vehicle; and when a U-turn route link to come back by passing from the closest link through the U-turn route again to the closest link is detected, performing a U-turn guide, based on a signal of this detection, to an effect that a return is made to the present position after a U-turn.

Thus, when one's vehicle passes again through the present position after making a U-turn ahead of one's vehicle, a guide is made to that effect. Therefore, the driver is able to make a U-turn by utilizing an appropriate place on the way based on his/her own determination without taking the trouble of going all the way to the U-turn spot, thereby attaining an effect in that the driving along an unnecessary section can be omitted.

The guide indication method in an onboard navigator according to this invention is characterized in that the onboard navigator is a map navigator and that the U-turn guide is a character indication to the effect that a return is made to the present position after a U-turn.

Thus, when one's vehicle passes again through the present position after making a U-turn ahead of one's vehicle, that fact is reported to the driver by means of character indication. Therefore, there is an effect in that the driver is able to omit the driving along an unnecessary section.

The guide indication method in an onboard navigator according to this invention is characterized in that the onboard navigator is an arrow navigator and that the U-turn guide is made up of a mark showing a U-turn and a distance to return to the present position.

Thus, when one's vehicle passes again through the present position after making a U-turn ahead of one's vehicle, that fact is reported to the driver by means of the mark and the distance. In the arrow navigator, there is an effect in that the driver is able to omit the driving along an unnecessary section.

The guide indication method in an onboard navigator according to this invention is characterized in that the U-turn guide is a voice guide.

Thus, when one's vehicle passes again through the present position after making a U-turn ahead of one's vehicle, that fact is reported also in a voice. Therefore, there is an effect in that the confirmation of the U-turn guide becomes easier and that the driver is able to omit the driving along an unnecessary section.

DETAILED DESCRIPTION OF THE EMBODIMENTS

In order to describe this invention in more detail, a description will now be made about the best mode for carrying out the invention with reference to the accompanying drawings.

Embodiment 1

Figure 1:
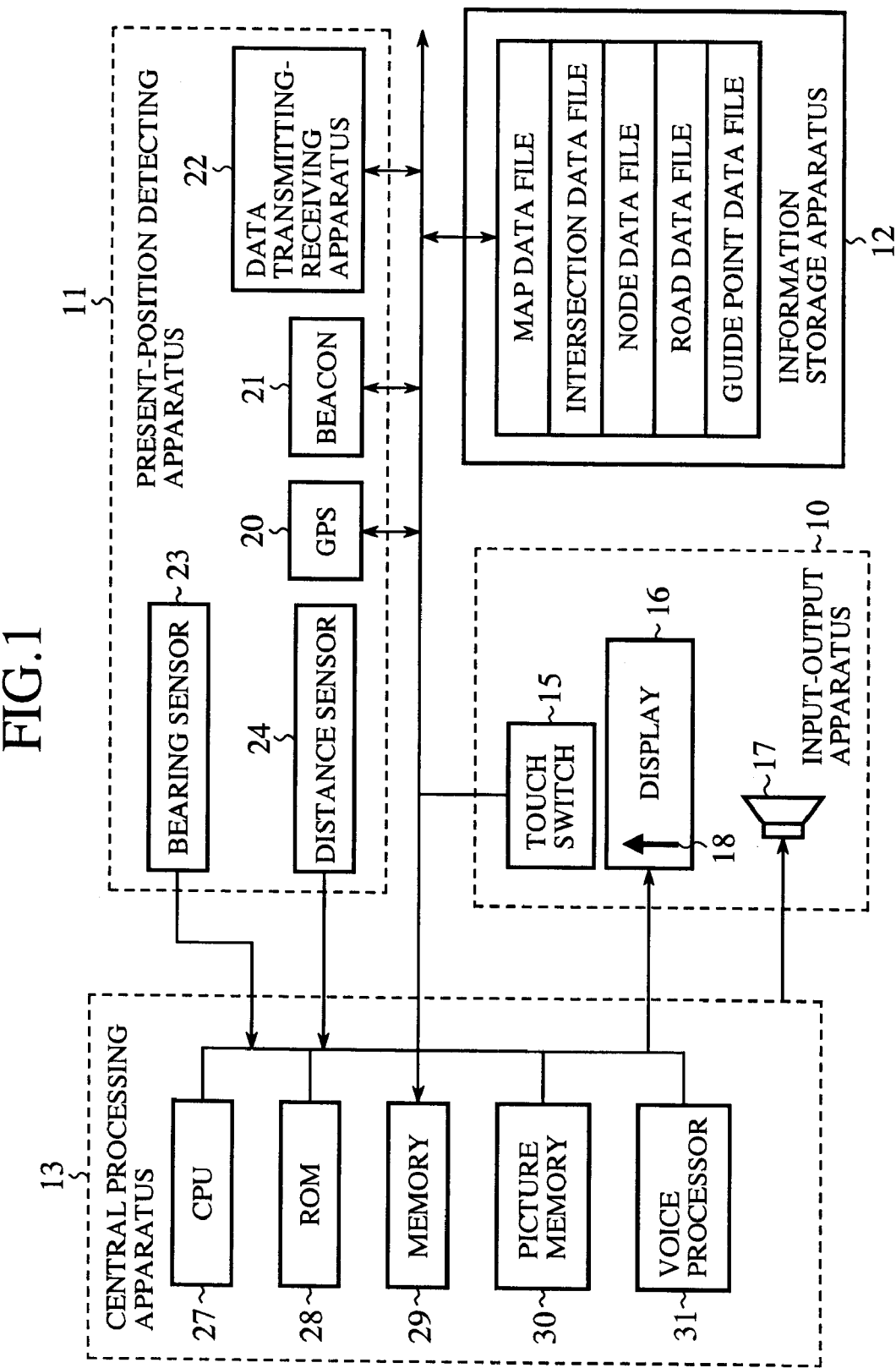
FIG. 1 is a block diagram of an onboard navigator for performing a guide indication method in an onboard navigator of this invention.

FIG. 1 is a block diagram showing one example of an onboard (in-vehicle) navigator for carrying out this invention. In the figure, reference numeral 10 denotes an input-output apparatus for inputting and outputting information relating to route guides, reference numeral 11 denotes a present-position detecting apparatus for inputting and outputting information relating to the present position of one's vehicle, reference numeral 12 denotes an information storage apparatus which records navigation data required for route computation as well as required guide data relating to the route guiding, and reference numeral 13 denotes a central processor or processing apparatus which performs route search processing, or guide processing required for route guiding by indication and by a voice, as well as controlling of the entire system.

The input-output apparatus 10 is to input the information necessary for the settings of departure places, destinations, passing points, and the like, and to give a command to the central processing apparatus 13 to issue guide information as a voice output and as a picture screen indication when required by a driver, and is provided with a touch switch 15, a display 16, a speaker 17, and the like. In case of an arrow navigator, this display 16 indicates a road link and an arrow 18 showing the direction of the destination in the form of an icon, and the map guide is not indicated.

The present-position detecting apparatus 11 is composed of a GPS receiving apparatus 20 utilizing a global positioning system (GPS), a beacon receiving apparatus 21, a data transmitting-receiving apparatus 22, a bearing sensor 23, a distance sensor 24, and the like.

The information storage apparatus 12 is composed of: a map data file having stored therein map information required for the route guiding; an intersection data file having stored therein information relating to intersections; a road data file having stored therein information about the kind of the roads, a departure point and a terminal point of each road, and the like; a node data file having stored therein coordinates of latitudes and longitudes at certain points on the roads; and a guide point data file having stored therein positional coordinates of landmarks such as gas stations, convenience stores, and the like.

The central processing apparatus 13 is provided with: a central processing unit (CPU) 27 for computation processing by performing programs for the navigation system; a read-only memory (ROM) having stored therein a program for performing the processing such as route searching, and the like, a program for performing an indication control required for landmark indication at guided intersections, a program for performing a voice output control required for voice guide, and data required therefor, as well as indication data required for route guiding and map indication; a memory 29 for temporarily storing therein data of a route memory means which stores therein road information (road array data, guided intersection data) for route searching or after re-searching, as well as data on route guide information and data under computation processing; a picture memory 30 storing picture data to be used in picture indication on the display; a voice processor 31 for synthesizing voice data read out from the information storage apparatus 12 based on a voice output control command from the CPU 27 and for converting the resultant into analog signals to thereby output them to the speaker 17.

Figure 2:
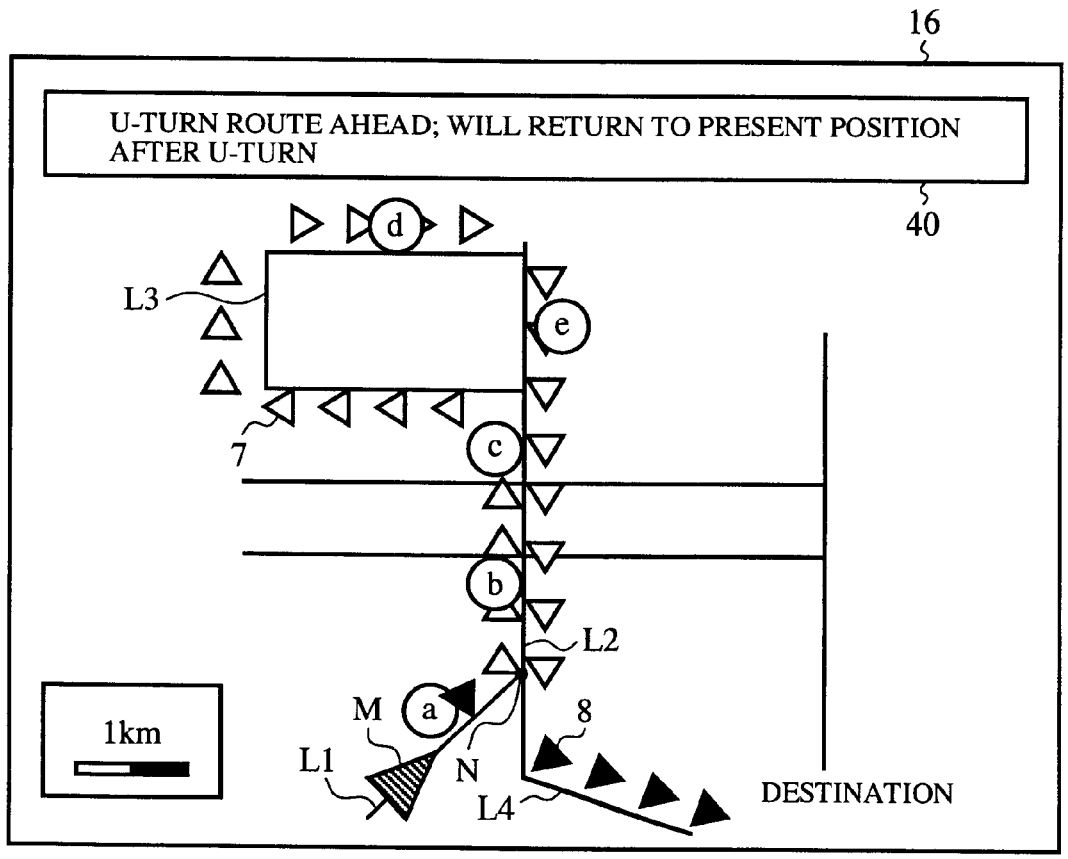
FIG. 2 is a schematic diagram showing an example of an indicating picture screen of a map navigator of an embodiment 1 of this invention.
Figure 4:
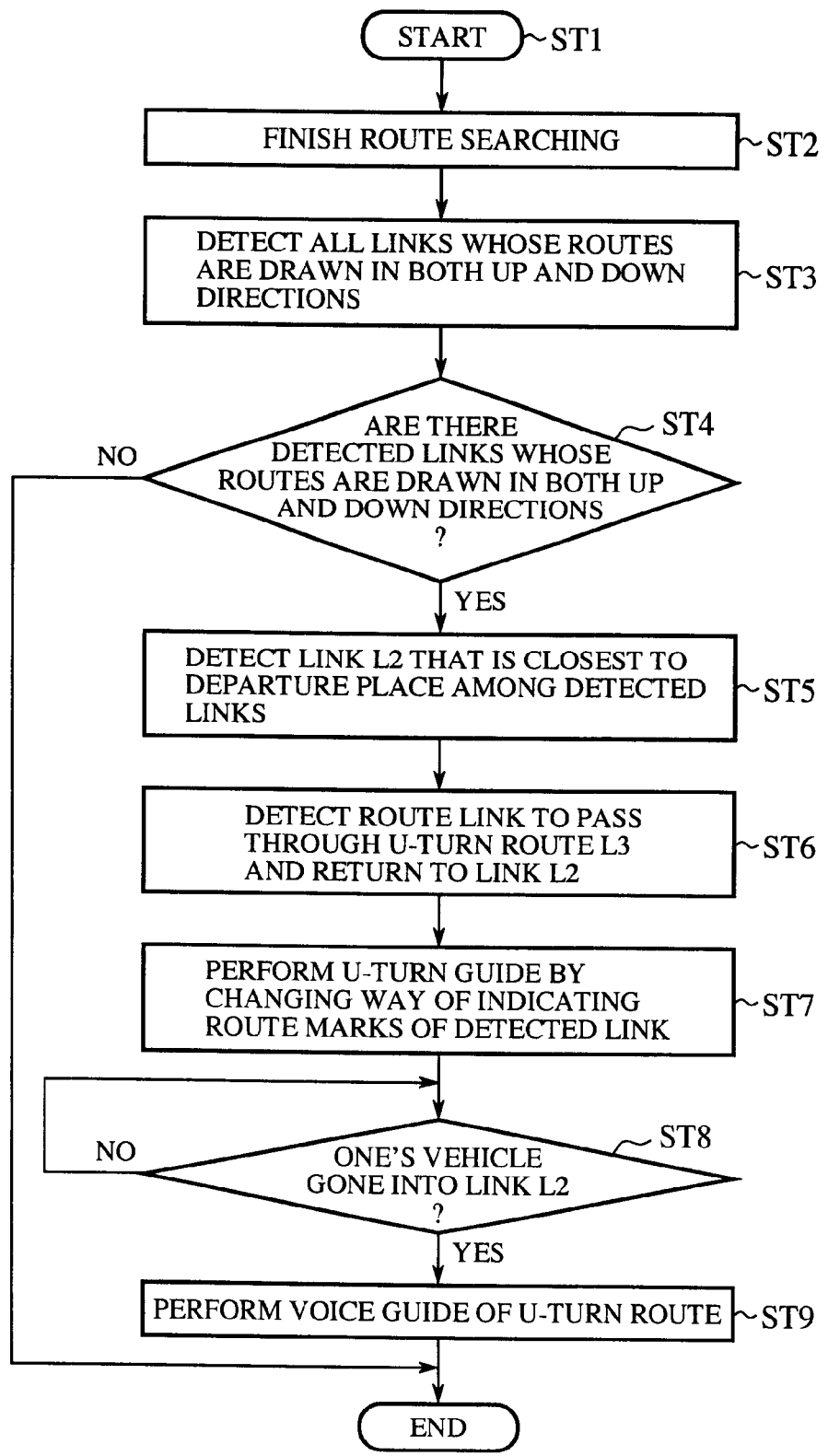
FIG. 4 is a flow chart showing the operation of the guide indication method according to this invention.

FIG. 2 is an example of a picture screen indication in a case where the onboard navigator is a map navigator, and FIG. 4 is a flow chart showing the guide indication operation of a U-turn.

Figure 5:
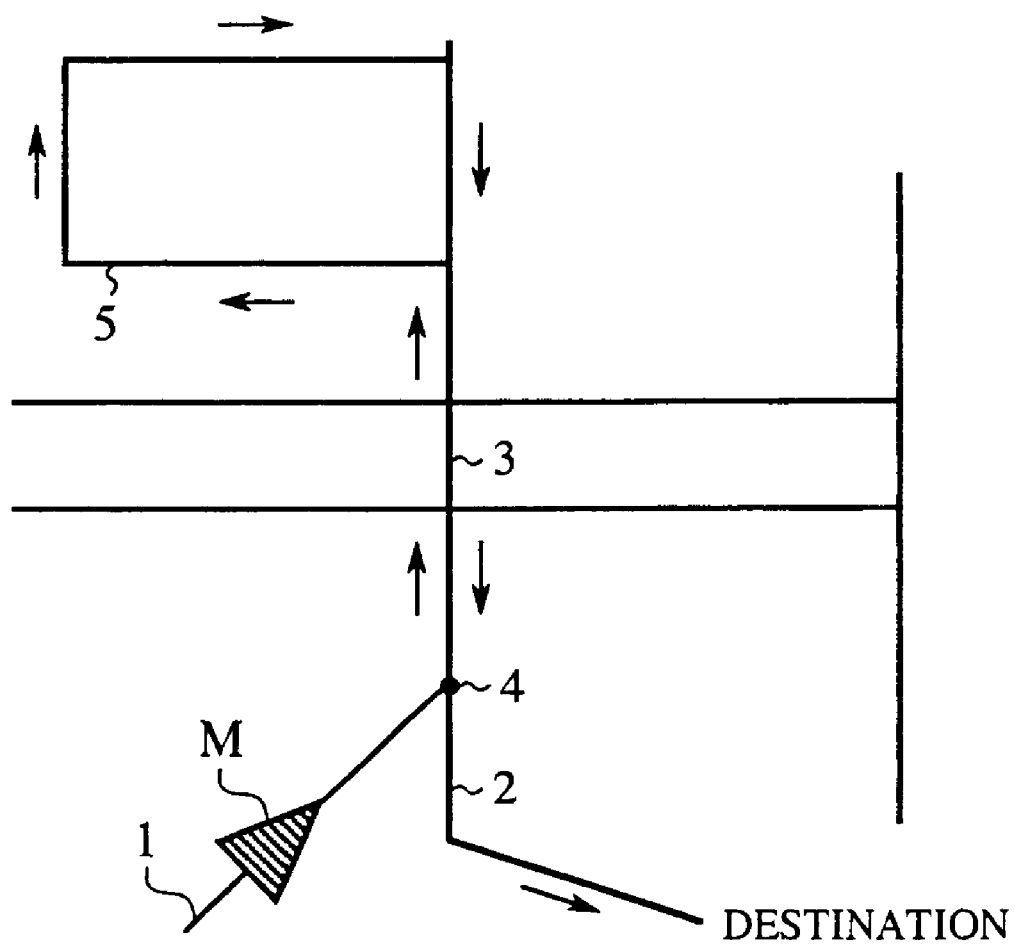
FIG. 5 is an explanatory diagram showing the road traffic conditions having a U-turn route.

A description will now be given of an example of a road traffic condition such as the one shown in FIG. 5. The picture screen of the display 16 of the onboard navigator is such that, as shown in FIG. 2, one's vehicle M travels along a road link which is an ordinary route and is bound for a destination. During that period of time, a route searching is started (step ST1) and, when the route searching is completed (step ST2), all the links whose routes are drawn in both up and down directions are detected (step ST3).

A determination is made as to whether links whose routes are drawn in both up and down directions have been detected or not (step ST4). If they are not detected, the U-turn guide processing is completed and, if they are detected, the link L2 that is the closest to the departure place is detected (step ST5). The operations of these searching, detection, determination, and the like are performed in the central processing apparatus 13 (the same applies to the below-described operations).

In order for one's vehicle M to enter an ordinary route L4 (route leading to the destination) from the link L1, it is necessary to pass through an ordinary route 8 which turns to the right at an intersection (node N) with the link L2. In case the node N is prohibiting the right-turn, a left-turn is made to continue and a detection is made of a route to pass through a U-turn route link L3 to return again to the link L2 (step ST6), and an indication in the form of a map as shown in FIG. 2 is made on the display 16.

Then, when a determination is made that the U-turn route L3 detected at step ST6, as described above, returns again to the link L2 which is the present position, the onboard navigator makes a U-turn guide as described below (step ST7).

In the map navigator, it is possible to indicate the U-turn route by means of triangular marks 7, as shown in FIG. 2, or of a line indication with arrows and colors. The U-turn guide indication 40 is made by a character indication of "U-turn route ahead; will return to present position after U-turn." In the map navigator, it is sometimes not possible to indicate all the picture screen up to the U-turn spot if the U-turn spot is far away. In such a case, if the guide shows only "U-turn route ahead", it is unknown how far the U-turn spot is located ahead. Therefore, a U-turn will have to be made after running, e.g., several kilometers to come. On the other hand, by adding a guide of "will return to the present position after U-turn", it becomes possible for the driver to determine on the way to the U-turn spot to make a U-turn by utilizing an appropriate vacant lot, a parking lot, a side road, or the like.

When one's vehicle M is determined to have entered the link L2 in accordance with the guide of the onboard navigator (step ST8), the guide indication as shown in FIG. 2 is continued and the voice guide of the U-turn route, i.e., a reporting of "U-turn route ahead; will return to present position after U-turn" will be made in voice.

Embodiment 2

Figure 3:
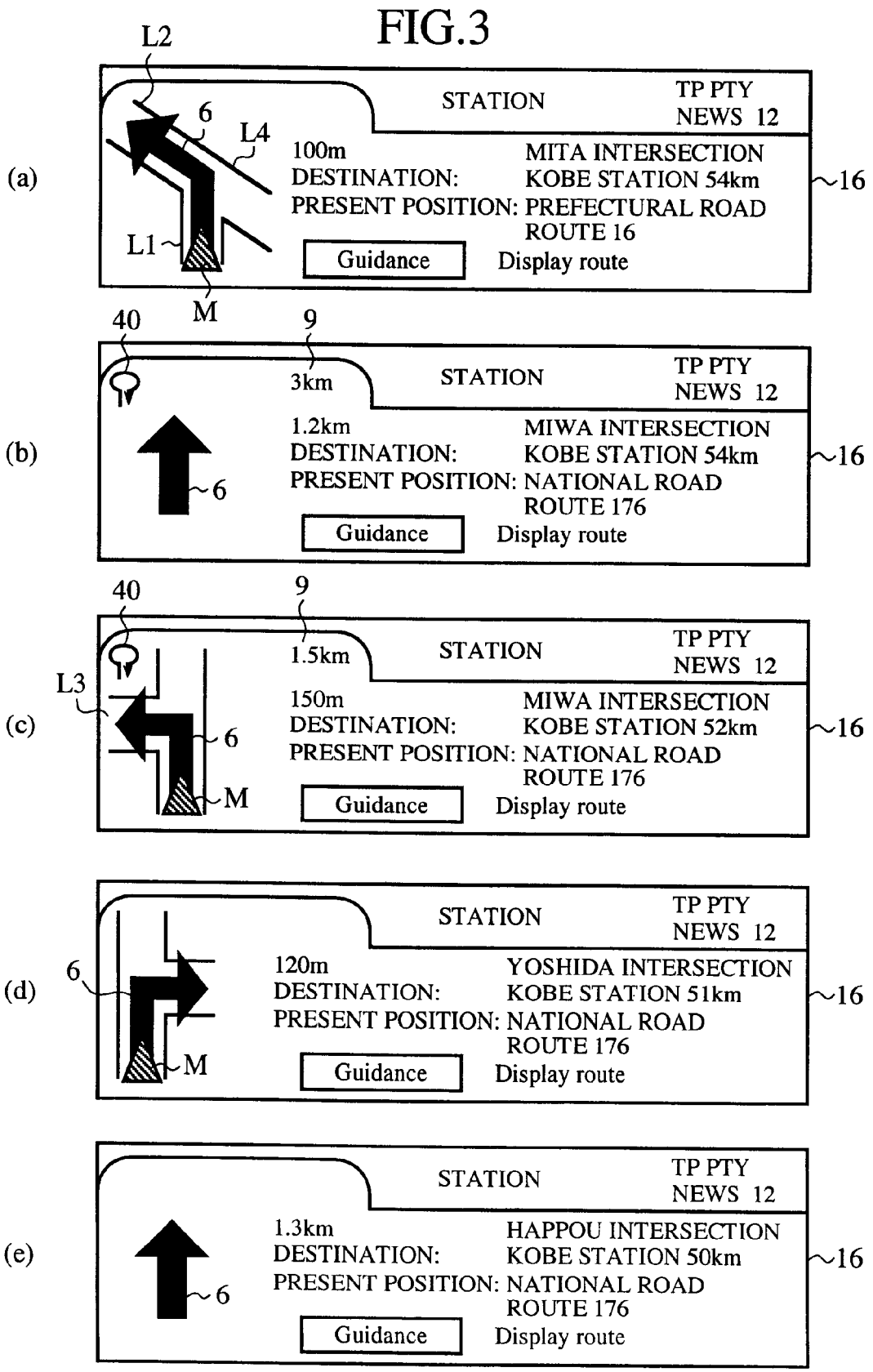
FIG. 3 includes schematic diagrams showing examples of indicating picture screens of a map navigator of the embodiment 2 of this invention.

FIG. 3 includes examples of picture screen indications in case the onboard navigator is an arrow navigator. A description will now be given of the guide indication operation for U-turn in the arrow navigator. Since this embodiment corresponds to the picture screen in FIG. 2 and the flow chart in FIG. 4, a description will be made in a duplicated manner.

When a route searching is started. (step ST1) and the route searching is finished (step ST2), all the links whose routes are drawn in both up and down directions are detected (step ST3).

A determination is made as to whether links whose routes are drawn in both up and down directions have been detected or not (step ST4). If they are not detected, the U-turn guide processing is completed and, if they are detected, the link L2 that is the closest to the departure place is detected (step ST5).

In order for one's vehicle M to enter the ordinary route L4 (route leading to the destination) from the link L1, it is necessary to turn to the right at an intersection (node N) with the link L2. If the right-turn is prohibited here, a left-turn is made to continue and a detection is made of a route to pass through a U-turn route link L3 to return again to the link L2 (step ST6).

In the arrow navigator, as shown in FIG. 3(a) (corresponding to points "a" through "e"), a guide indication is made by an arrow 6 which turns to the left from the link L1 toward the direction of the link L2. Depending on the necessity, character indication is made of the station which is the destination, Mita intersection which is the next. intersection, the distance of 100 m to the intersection, destination: Kobe station, present position: national road route 176, or the like. The mode of these indications is arbitrary and the illustrated example is one example only.

Then, when the onboard navigator detects that the U-turn route link L3 detected at step ST6 as described above returns to the link L2 which is the present position, the U-turn guide is made (step ST7).

In the arrow navigator, the U-turn guide indication 40 is made by an indication of a U-turn mark as illustrated in FIG. 3(b), and the distance 9 for one's vehicle to return to the present position after U-turn is indicated, e.g., as "3 km."

If one's vehicle M is determined to have entered from the link L2 into the route link L3 according to the guide of the onboard navigator (step ST8), the guide of.the U-turn route is made as described below. In case of the arrow navigator, when one's vehicle has reached the point. "c" as shown in FIG. 3(c), the arrow 6 becomes a left-turn guide and the distance becomes "1.5 km." When one's vehicle M has reached the point "d", the U-turn guide disappears and the arrow 6 becomes a right-turn guide. When one's vehicle has reached the point "e", the arrow 6 becomes a straight-running guide. In the arrow navigator, it is also possible to perform the voice guide for the U-turn route in a manner, e.g., as "U-turn route ahead; will return to the present position after U-turn; distance to the present position is 3 km" (step ST9).

In this manner, also in the arrow navigator, since the running mode of U-turn as well as the distance to return to the present position are known, it becomes possible for the driver to do a determination of making a U-turn on the way as well.

As described above, when one's vehicle makes a U-turn ahead of one's vehicle and passes once again through the present position, the onboard navigator relating to this invention is capable of reporting to that effect. Therefore, it offers a method of guide indication suitable both for the map navigator and the arrow navigator.

What is claimed is:

1. A guide indication method for an onboard navigator in which a route guide to a destination along a route set in advance is indicated on a display, comprising:

detecting, through a route searching, a closest link, on which a vehicle is traveling, that diverges from a node located on the route set in advance;

determining whether the vehicle travels along the closest link in both directions of the closest link to return to the node; and performing a U-turn guide to indicate that the vehicle will return to the node by performing a U-turn on the closest link, when the determining step determines that the vehicle must travel along the closest link in both directions to return to the node.

2. The guide indication method for an onboard navigator according to claim 1, wherein said onboard navigator is a map navigator and wherein said U-turn guide is a character indication to the effect that a return is made to the present position after a U-turn.

3. The guide indication method for an onboard navigator according to claim 1, wherein said onboard navigator is an arrow navigator and wherein said U-turn guide is made up of a mark showing a U-turn and a distance to return to the present position.

4. The guide indication method for an onboard navigator according to claim 1, wherein said U-turn guide is a voice guide.

5. The guide indication method for an onboard navigator according to claim 2, wherein said U-turn guide is a voice guide.

6. The guide indication method for an onboard navigator according to claim 3, wherein said U-turn guide is a voice guide.

* * * * *